G. J. CHISHOLM.
SPRAY NOZZLE.
APPLICATION FILED APR. 24, 1915.
1,197,446.
Patented Sept. 5, 1916.
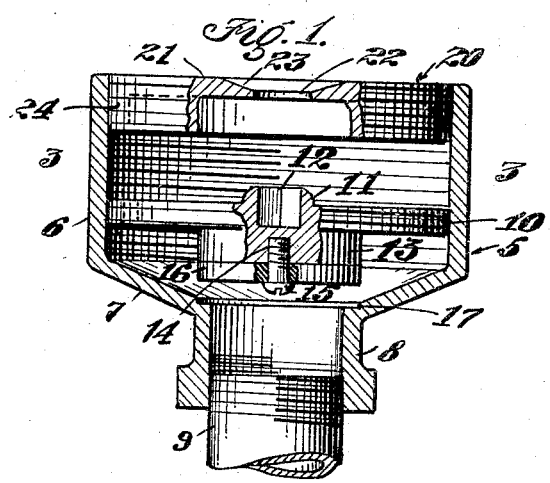
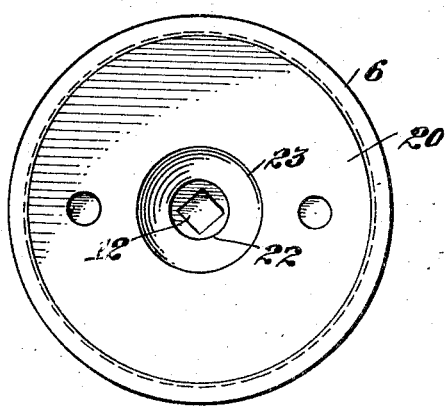
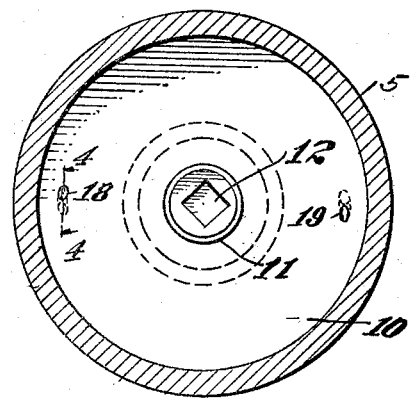
Inventor,
George J. Chisholm.
by
Edward R. Strauss
atty.

UNITED STATES PATENT OFFICE.

GEORGE J. CHISHOLM, OF PASADENA, CALIFORNIA.

SPRAY-NOZZLE.

1,197,446.  Specification of Letters Patent.  Patented Sept. 5, 1916.

Application filed April 24, 1915. Serial No. 23,643.

*To all whom it may concern:*

Be it known that I, GEORGE JACKSON CHISHOLM, a citizen of the United States, residing at Pasadena, in the county of Los Angeles and State of California, have invented new and useful Improvements in Spray-Nozzles, of which the following is a specification.

This invention relates to a spray nozzle and pertains especially to spray nozzles of the gyratory type.

It is an object of this invention to provide a spray nozzle with means for adjusting the area which will be covered by the spray.

It is another object of this invention to provide a spray nozzle which can be permanently attached to distribution pipes in the ground and which can be shut off from operation at the nozzle itself without requiring the use of auxiliary apparatus.

My invention comprises a casing provided with a wall having inclined ports through which liquid is admitted. The liquid enters in a direction tangential to the side wall of the casing, and is thereby given a whirling motion. A closure plate having a discharge opening is provided at the upper portion of the nozzle casing and the liquid discharges through the opening, producing a spray. The wall containing the inclined ports is made adjustable and has on its lower surface a valve disk which coöperates with the inlet port of the casing, thereby providing a throttle valve. A key socket is formed in the adjustable wall so that a key may be inserted through the opening in the closure plate and engaged in the key socket for adjusting the wall.

An embodiment of my invention is illustrated in the accompanying drawing, in which:

Figure 1 is an elevation of the nozzle with the casing and parts of the adjustable disk and closure plate in section. Fig. 2 is a plan view of the nozzle. Fig. 3 is a horizontal section on the line 3—3 of Fig. 1. Fig. 4 is an enlarged fragmentary vertical section on the line 4—4 of Fig. 3.

More specifically, 5 indicates the nozzle casing which is comprised of a cylindrical wall 6, a head 7 of frusto conical form, and a nipple 8 which serves as an inlet port for liquid. The casing is preferably cast in one piece of brass or any other suitable metal. The interior surface of wall 6 is provided with threads, and the interior surface of nipple 8 is also provided with threads for engagement by the threads upon a pipe 9.

A disk 10 having threads on its periphery adapted to engage the threads on the interior of wall 6 is provided with a boss 1 which has a recess 12 square in cross section adapted to receive a key. A cylindrical disk portion 13 is disposed upon the opposite side of disk 10 and has a diameter greater than that of the casing inlet port. A threaded aperture 14 is provided at the center of disk 13 and is adapted to be engaged by a set screw 15. Set screw 15 holds in position a washer 16 of rubber or other material suitable for use as a valve disk. The nipple 8 is counterbored at 17 to form a seat for the washer 16 and disk 13. Adjacent the periphery of the disk 10 inclined ports 18 and 19 are formed. The ports are inclined so that liquid passing through will be directed tangentially in the same direction.

A closure plate or nozzle head 20 is provided which consists of a disk portion 21 provided with a discharge opening 22 which has a tapered portion 23 and a flange 24 which is threaded. The closure plate is preferably of cast metal and is adapted to be threaded into the open portion of the casing 5.

The nozzle is attached to a distributing system; water under pressure passes through the inlet nipple 8 into the casing 5, through the ports 18 and 19, into the chamber formed between disk 10 and closure plate 20; in this chamber it whirls, discharging through the outlet opening 22 in the form of a spray. If the area sprayed is too great the nozzle may be adjusted by inserting a key through the opening 22 engaging the key slot, then turning the key so that disk 10 is turned in a direction such that it moves closer to the inlet port. This moves disk 13 and washer 16 toward the inlet port, throttling the inflow of liquid and if desired, the entire flow may be cut off.

My nozzle is advantageous as spray nozzles are often disposed in corners where it is desirable that the spray be reduced as compared with other nozzles in order not to wet walks or certain places in the immediate neighborhood of the nozzle. It is often convenient to spray certain parts and not desirable to spray others. For illustration, a garden and a lawn may be so located upon the grounds and piped that they can be sprayed at one time by turning the water into the distributing pipes. There may, however, be times when it is not desirable to spray the garden while the lawn is sprayed or vice versa, and the nozzles situated in the garden can be closed by applying a key to such nozzles.

What I claim is:

A spray nozzle, comprising a casing having a cylindrical wall threaded on its interior, a closure disk provided with a circular opening at its center and a head provided with a centrally disposed inlet port surrounded by a valve seat; an adjustable wall comprising a disk having threads on its periphery, a key socket at its center registering with said circular opening, and inclined ports adjacent its periphery; and a valve disk secured to said adjustable wall and arranged to form with said valve seat a throttle valve.

In witness that I claim the foregoing I have hereunto subscribed my name this 12th day of April, 1915.

GEO. J. CHISHOLM.

Copies of this patent may be obtained for five cents each, by addressing the "Commissioner of Patents, Washington, D. C."